(12) United States Patent
Kelly (10) Patent No.: US 11,544,087 B2
(45) Date of Patent: Jan. 3, 2023

(54) DESKTOP DISPLAY ASSIGNMENT OPTIMIZATION IN A VIRTUAL DESKTOP ENVIRONMENT

(71) Applicant: DELL PRODUCTS L.P., Round Rock, TX (US)

(72) Inventor: John Kelly, Mallow (IE)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 17/148,241

(22) Filed: Jan. 13, 2021

(65) Prior Publication Data

US 2022/0222094 A1    Jul. 14, 2022

(51) Int. Cl.
*G06F 9/451* (2018.01)
*G06F 9/445* (2018.01)
*G06F 3/14* (2006.01)
*G06T 1/20* (2006.01)

(52) U.S. Cl.
CPC ............... *G06F 9/452* (2018.02); *G06F 3/14* (2013.01); *G06F 9/4451* (2013.01); *G06T 1/20* (2013.01)

(58) Field of Classification Search
CPC .......... G06F 9/452; G06F 9/4451; G06F 3/14
See application file for complete search history.

(56) References Cited

U.S. PATENT DOCUMENTS

2010/0293504 A1* 11/2010 Hachiya .................. G06F 9/451
715/806
2016/0139948 A1* 5/2016 Beveridge ............. G06F 9/5005
718/1

* cited by examiner

*Primary Examiner* — Andrea C Leggett
(74) *Attorney, Agent, or Firm* — North Weber & Baugh LLP (57) ABSTRACT

Presented are systems and methods for implementing configuration modes of operation for virtual desktop infrastructure (VDI) environments that receive display information, such as monitor count capability information and monitor resolution capability information, from an administrator or elements in a VDI environment and use that display information to generate a recommendation for a virtual desktop display (VDD) configuration that may comprise an initial monitor count and an initial monitor resolution. Elements in the VDI environment are queried to obtain VDD utilization information, such as actual window counts and sizes. The VDD utilization information is then used to update the VDD configuration recommendation to conserve computing resources or enhance a user experience.

20 Claims, 7 Drawing Sheets

DESKTOP DISPLAY ASSIGNMENT OPTIMIZATION IN A VIRTUAL DESKTOP ENVIRONMENT

BACKGROUND

The present disclosure relates generally to information handling systems. More particularly, the present disclosure relates to desktop display assignment optimization systems and methods for VDI environments.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As remote working initiatives continue to gain traction in many organizational environments, these organizations continue to look at VDI environments as a secure solution that allows important organizational data to reside in data centers while continuing to deliver good user-experience for end users. The profile of users who use VDI environments includes a spectrum of users from task workers with relatively low-end compute requirements to high-end users who require a rich multimedia experience, including multiple monitors. Historically, calculation of the number of monitors required by a VDI environment has been a complex process, as there are a number of layers of the environment that determine the nature of multi-monitor support provided, e.g., thin client, datacenter graphics card, and virtual desktop (VD) broker/client/protocol combinations. In addition, there is a need to understand users' true requirement for multi-monitor support based on the intensity of users' screen real estate usage.

Accordingly, it is highly desirable to find new and more efficient analytics-based ways to assess multi-monitor connectivity options and user requirements for a given VDI environment.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

DETAILED DESCRIPTION OF EMBODIMENTS

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms, and any examples are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably.

It shall be noted that although embodiments described herein may be within the context of VDI environments, aspects of the present disclosure are not so limited. Accordingly, the aspects of the present disclosure may be applied or adapted for use in other contexts.

In this patent document, the terms "configuration settings," "settings," and "parameters" may be used interchangeably; the terms "virtual machine (VM)," "VDI VM," "VM desktop," "virtual desktop display," and "virtual desktop" may be used interchangeably. Similarly, the terms "client device estate" and "endpoint device estate" are used interchangeably. Each reference/document mentioned in this document is incorporated by reference herein in its entirety.

Vendors publish information regarding the number of supported monitors and supported monitor resolutions. For example, Dell Products L.P. publishes such information in relation to its thin clients, Nvidia Corporation publishes it in relation to its datacenter graphics processing units (GPUs) (and associated virtual GPU (vGPU) configuration used in VDIs), VMware, Inc. publishes the information for its protocols, cloning technologies, and desktop broker software versions. For existing VDI architectures, a VDI administrator typically collates all these published pieces of information in a cumbersome manual process to select an appropriate configuration that, at least partially, relies on the administrator's intuitive understanding of user requirements and the determination of a lowest common denominator or weakest link in the VDI environment.

In contrast, various embodiments presented herein utilize data-driven environment optimization that automatically aggregates information and dynamically determines both user requirements and environment capabilities in a VDI environment such as to generate and assign or recommend suitable configuration settings for VDD assignments and optimize resource utilization. Various systems and methods take into account policies, actual monitor utilization that may be assessed, and available administrator input information, if present.

Figure 1:
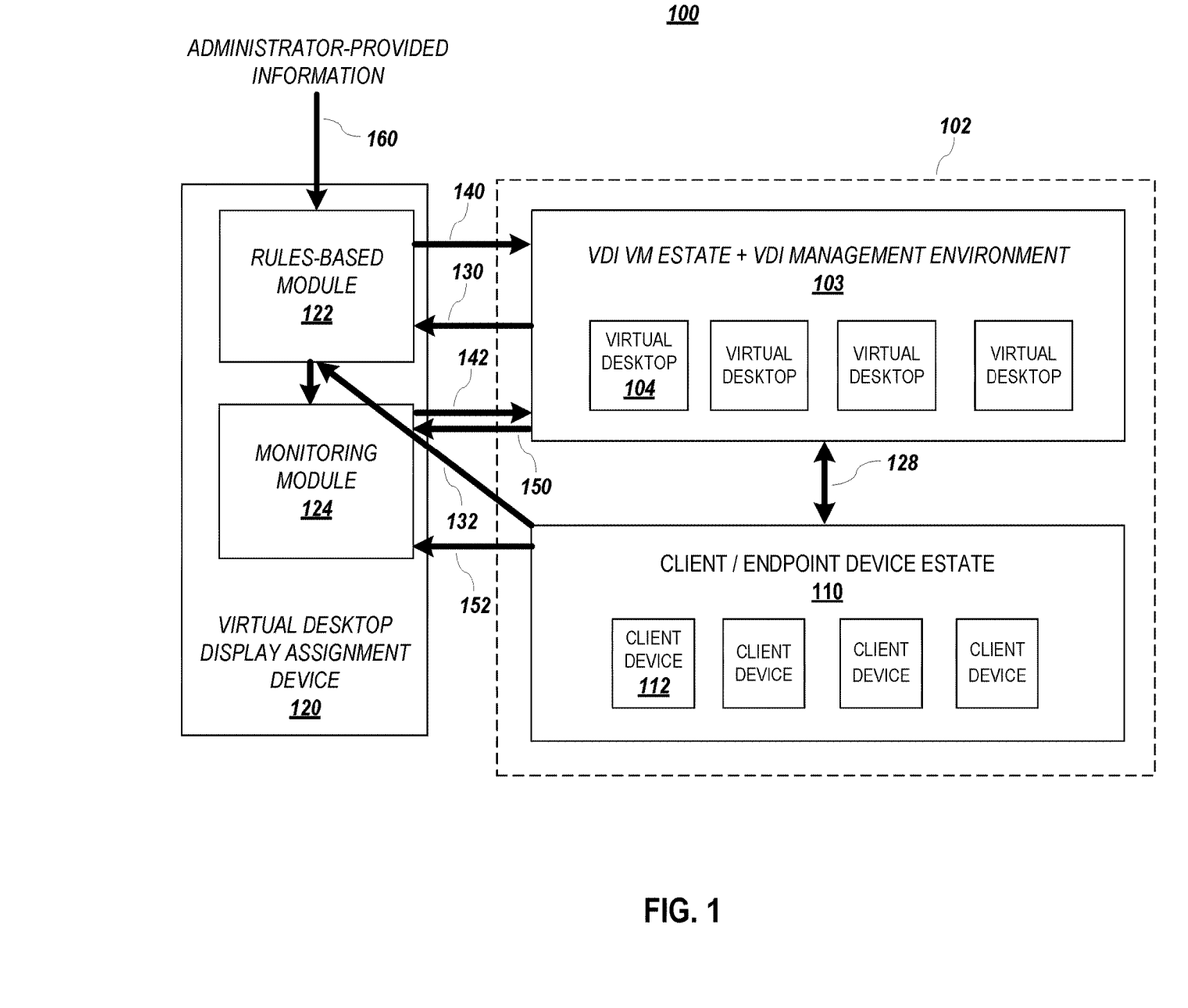
FIG. 1 ("FIG. 1") depicts a system block diagram for a VDI architecture for a VDD assignment according to embodiments of the present disclosure.

FIG. 1 depicts a system block diagram for a VDI architecture for a VDD assignment system according to embodiments of the present disclosure. In one or more embodiments, VDI system 100 comprises VDD assignment device 120 and multi-user VDI environment 102 that further comprises VDI VM estate and VDI management environment 103 and client device estate 110. VDD assignment device 120 may further comprise rules-based module 122 and monitoring module 124.

In one or more embodiments, VDI VM estate and VDI management environment 103 may be implemented on host hardware that may operate multi-user VDI environment 102. As depicted in FIG. 1, VDI environment 102 may comprise any number of virtual desktops instances (e.g., 104) that may operate on a physical server that may have been partitioned into several virtual servers, e.g., by a hypervisor that creates, operates, and monitors virtual desktops 104. Similarly, client device estate 110 may comprise any number of end-user or client/endpoint devices (e.g., 112), such as laptops, PCs, thin clients, and tablets. To accomplish the various objectives of the present disclosure, in one or more embodiments, VDD assignment device 120 may be implemented, e.g., in a network device such as remote server.

In regular operation, client devices 112 in client device estate 110 may communicate with any virtual desktop 104 in VDI VM estate and VDI management environment 103 by using any known protocol in the art, e.g., to exchange remote desktop traffic 128 or any other regular protocol traffic. Users, once authenticated, may remotely access independent virtual desktop instances from end-user or client/endpoint devices 112 in client device estate 110. In one or more embodiments, subsequent to a successful login from client device 112, virtual desktop 104 may grant access to client device 112 permitting client device 112 to access VDI environment 102 to enable users to connect and communicate with separate virtual desktop instances. Virtual desktop instances may accommodate customized settings and access for launching individual applications for a remote session on virtual desktop 104 provided to client device 112. VM images and user-related data, such as access information, may be remotely stored on a host computer that may provide a user with a personalized virtual desktop 104.

It is understood that a VDI administrator may generally use VDI management software to provision virtual desktops 104 and perform various management functions. The administrator may use parameters or configuration settings that client devices 112 may be programmed to use when accessing VDI VM estate and VDI management environment 103. It is noted that while arrows in FIG. 1 are mainly depicted as one-way arrows, it is understood that communication between any components within VDI system 100 is not so limited and may be bidirectional, irrespective of the presence and type of arrows depicted in FIG. 1.

In one or more embodiments, configuration settings for desktop display information may have been provided by or derived from an administrator 160 and/or from elements within VDI environment 102 and may comprise monitor count capability information and monitor resolution capability information. In one or more embodiments, VDD assignment device 120 may be implemented as a monitoring-based recommendation component that may use rules-based recommendation module 122 and monitoring module 124. The operation of these modules and the relative sequence of their usage is described further below.

In one or more embodiments, rules-based component 122 may obtain, if available, display information 130, 132, such as monitor resolution and/or monitor count information, from various elements in VDI environment 102, e.g., via an application programming interface (API) or similar mechanism, e.g., a PowerShell script or any other scripting language, vGPU, protocol information, or non-protocol information.

It is understood that any number of elements in VDI environment 102 may support certain resolution and/or monitor count capabilities. The elements of a VDI solution stack, which may be viewed as variables that influence resolution and/or monitor count capability may comprise endpoint device 110 (e.g., thin client), remote display protocol(s) that use VDI environment 102, VD cloning technology, and, a VD broker (not shown) including version information. It is further understood that rules-based component 122 may obtain display information from a VDI administrator 160, e.g., in circumstances where certain elements in VDI environment 102 cannot or fails to provide one or more pieces of display information, or certain display information cannot be obtained for any other reason.

In one or more embodiments, rules-based component 122 may use the obtained display information to determine an overall capability of VDI system 100, e.g., based on the maximum number of monitors and their maximum resolutions that VDI environment 102 is able to support; elements in VDI system 100 that have the lowest monitor count and resolution capability; and the like. Rules-based recommendation module 122 may use display information that may have been received from any number of elements in VDI system 100 to generate display configuration traffic 140, 142. In one or more embodiments, display configuration traffic 140, 142 may comprise a VDD configuration recommendation, e.g., for an initial monitor count for a VDI deployment and monitor resolution information.

In one or more embodiments, an application logic (not shown) may be used to determine a maximum capability of VDI environment 102. The application logic may allow a user or administrator to specify, e.g., on a graphical user interface, a minimum desired screen resolution (e.g., "only show monitor count where each monitor supports at least 4K resolution"). The application logic may further be used to provide information to the administrator. It is understood that generating a VDD configuration recommendation 140, 142 for one or more users may involve using any suitable policy, e.g., one that involves increasing an existing resolution/monitor allocation in response to determining that a detected availability or actual utilization of monitor real estate satisfies a predetermined threshold.

In one or more embodiments of this analytics-based approach, monitoring module 124 may determine actual VDD utilization information 150, 152, e.g., by tracking, querying, or otherwise gathering monitor usage to ascertain users' true usage requirements. In one or more embodiments, a number of characteristics associated with users' actual usage of an operating system, such as the total number of open windows and the size of each window, e.g., specified in pixels, may be monitored. As discussed further below, such information may be gathered, e.g., through function calls in Microsoft Windows, to determine the total usage of available desktop monitor space (e.g., expressed as total pixel usage). The detected usage may then be used to determine, for example, a user requirement for increased monitor and resolution capability, or whether an existing resolution/monitor allocation in virtual desktops 104 can be reduced to conserve computing resources. To accomplish this, in one or more embodiments, VDD assignment device 120 may use utilization information 150, 152 to modify a VDD configuration recommendation to update VDD configuration recommendation 140, 142, such as monitor count and monitor resolution configuration, or any other existing configuration information.

It is understood that various components of the disclosure may be configured in a number of different ways. In one or more embodiments, an administrator may provide users with a minimal single monitor configuration that VDI environment 102 is able to support (note that by detecting a maximum capability of VDI environment 102, lesser configurations will be supported). Advantageously, such configurations aid in reducing datacenter side server/hyperconverged infrastructure (HCI) central processing unit (CPU) resource utilization, thereby, increasing user per host density. Once a configuration is deployed to users of VDI environment 102, in one or more embodiments, monitoring module 124 may be used to ascertain actual usage of monitor and resolution resources and assign incremental resources to meet, e.g., 80% of a user's desktop display requirements without having to stack windows.

In one or more embodiments, any number of virtual desktops may be deployed according to multi-monitor configuration for a maximum supported number of monitors and resolution based on a determined capacity, and for those users whose actual monitor size and count usage falls below a certain utilization threshold, one or more resources may be withdrawn and thereby conserved. In one or more embodiments, monitoring module 124 may be used to monitor usage in a physical environment, such as a physical PC usage of client devices in a nonvirtualized environment, thus providing insights into optimal VDD configuration for an initial VDI deployment.

Unlike in existing designs, where an administrator has to determine the capabilities of various elements in VDI environment 102, including their display information, such as resolution and monitor count, and manually configure initial settings accordingly, in one or more embodiments, capability information of VDI environment 102 can advantageously be automatically obtained, monitored, and automatically configured by using the analytics-based approach and with little to no human interaction. In addition, monitor resolution and monitor count requirements can be efficiently determined and adjusted for each user such as to conserve computing resources and enhance user experience.

Figure 2:
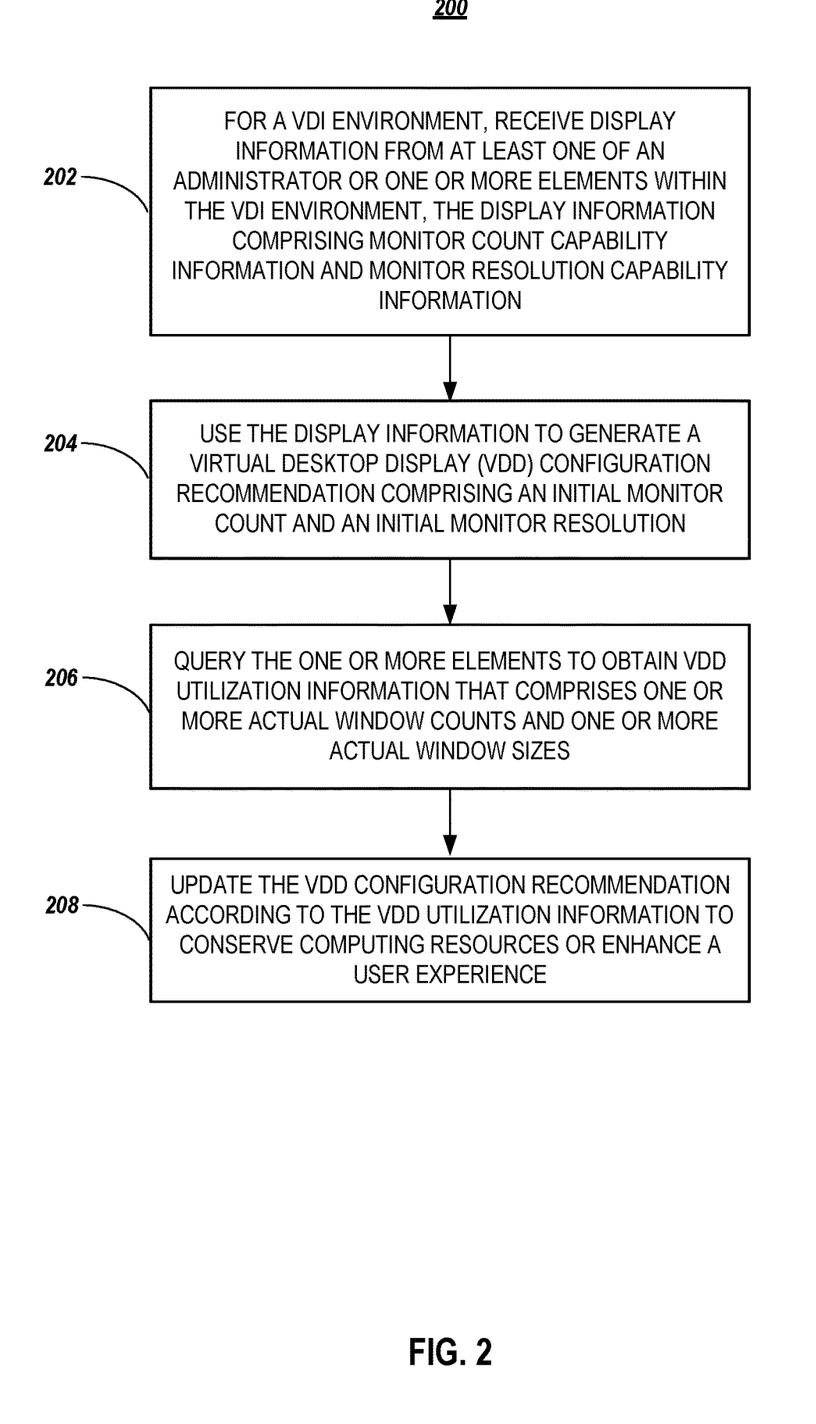
FIG. 2 depicts an exemplary process for implementing a minimal configuration mode of operation for a VDI environment, according to embodiments of the present disclosure.

FIG. 2 depicts an exemplary process for implementing a configuration mode of operation for a VDI environment, according to embodiments of the present disclosure. In one or more embodiments, process 200 may be performed by the VDI system depicted in FIG. 1. Process 200 may begin when, display information is received (202) from at least one of an administrator or one or more elements within a VDI environment. The display information may comprise monitor count capability information and monitor resolution capability information and may be used (204) to generate a VDD configuration recommendation that may comprise, e.g., an initial monitor count and an initial monitor resolution. Elements may be queried (206) to obtain VDD utilization information, which may comprise, e.g., one or more actual window counts and one or more actual window sizes. The VDD configuration recommendation may be updated (208) according to the VDD utilization information to conserve computing resources or enhance a user experience.

It shall be noted that in processes described herein: (1) certain steps may optionally be performed; (2) steps may not be limited to the specific order set forth herein; (3) certain steps may be performed in different orders; and (4) certain steps may be done concurrently.

In one or more embodiments, a stop condition may include: (1) a set number of iterations have been performed; (2) an amount of processing time has been reached; (3) convergence (e.g., the difference between consecutive iterations is less than a first threshold value); (4) divergence (e.g., the performance deteriorates); and (5) an acceptable outcome has been reached.

Figure 3:
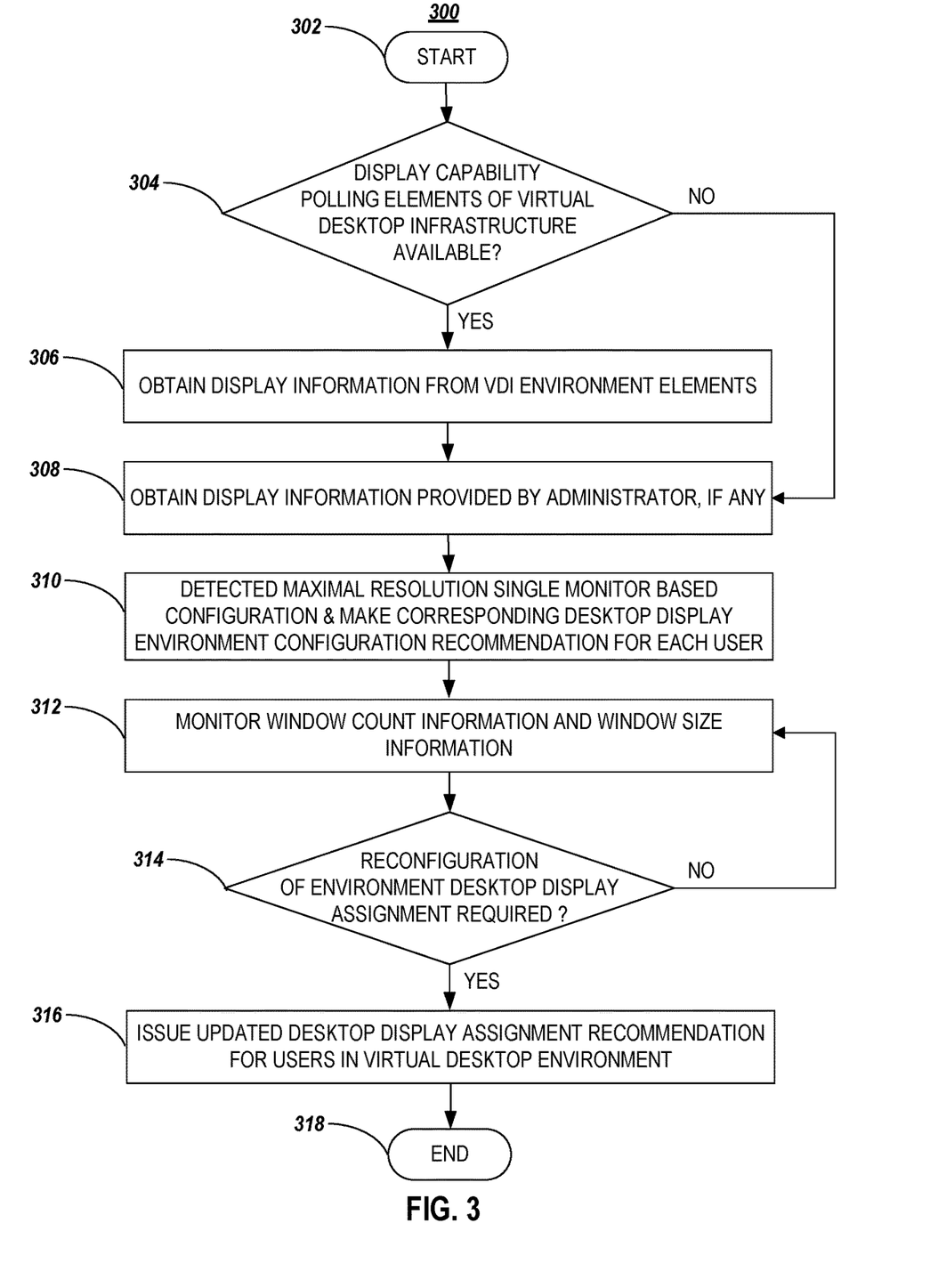
FIG. 3 depicts an exemplary process for implementing a maximal configuration mode of operation for a VDI environment, according to embodiments of the present disclosure.

FIG. 3 depicts an exemplary process for implementing a minimal configuration mode of operation for a VDI environment, according to embodiments of the present disclosure. In one or more embodiments, process 300 may begin (302) when it is determined (304), e.g., by a VDD assignment device that comprise a rules-based module and monitoring module, as depicted in FIG. 1, whether elements in a VDI environment, such as display capability polling elements, are available to provide, e.g., via an API call or any other suitable mechanism (e.g., scripting language), display information that may comprise monitor count and/or monitor resolution capability information.

If so, then the VDD assignment device may use the rules-based module to obtain (306) display information from elements in the VDI environment, such as the VDI VM estate and VDI management environment and/or physical endpoint devices in the client device estate depicted in FIG. 1. In one or more embodiments, the display information may be read from physical endpoint devices, virtual elements present in the VDI environment, or both.

Otherwise, process 300 may continue with obtaining (308) display information that may have been provided by an administrator, e.g., a VDI administrator who may have previously entered such information into a VDI management system for storage, access, and readout.

It is noted that once the display information is obtained (306) from elements in the VDI environment, additional display information may be obtained (308) from the administrator. In either event, process 300 may continue by detecting a maximal resolution single monitor based configuration and recommending (310), e.g., by using the rules-based module, a corresponding VDD configuration, for example for each user within the VDI environment.

In one or more embodiments, elements in the VDI environment may be monitored (312) and/or queried, e.g., by the monitoring module, to obtain VDD utilization information that may comprise window count information (e.g., by using a Window count PowerShell command) and/or window size information (e.g., by using a xwinfo system call or equivalent) associated with an actual window usage. It is understood that other equivalent function calls from both physical client devices and/or other elements in the VDI environment may be used, e.g., to determine how many windows are stacked per monitor and to calculate an actual usage of window size and/or resolution.

In one or more embodiments, the VDD assignment device may use the VDD utilization information to determine (314) whether the VDD configuration recommendation, e.g., a recommendation regarding a monitor count and/or resolution made at step (310), should be updated based on the actual window usage that was obtained at step (312). For example, the VDD configuration recommendation for users in the virtual desktop environment may be updated (316) to increase a monitor count and, thereby, increase user experience; or to decrease a monitor count to conserve computing resources or optimize other parameters of interest to the VDI management system. In one or more embodiments, process 300 may return to resume monitoring (312) in the VDI environment to make recommendations.

Figure 4:
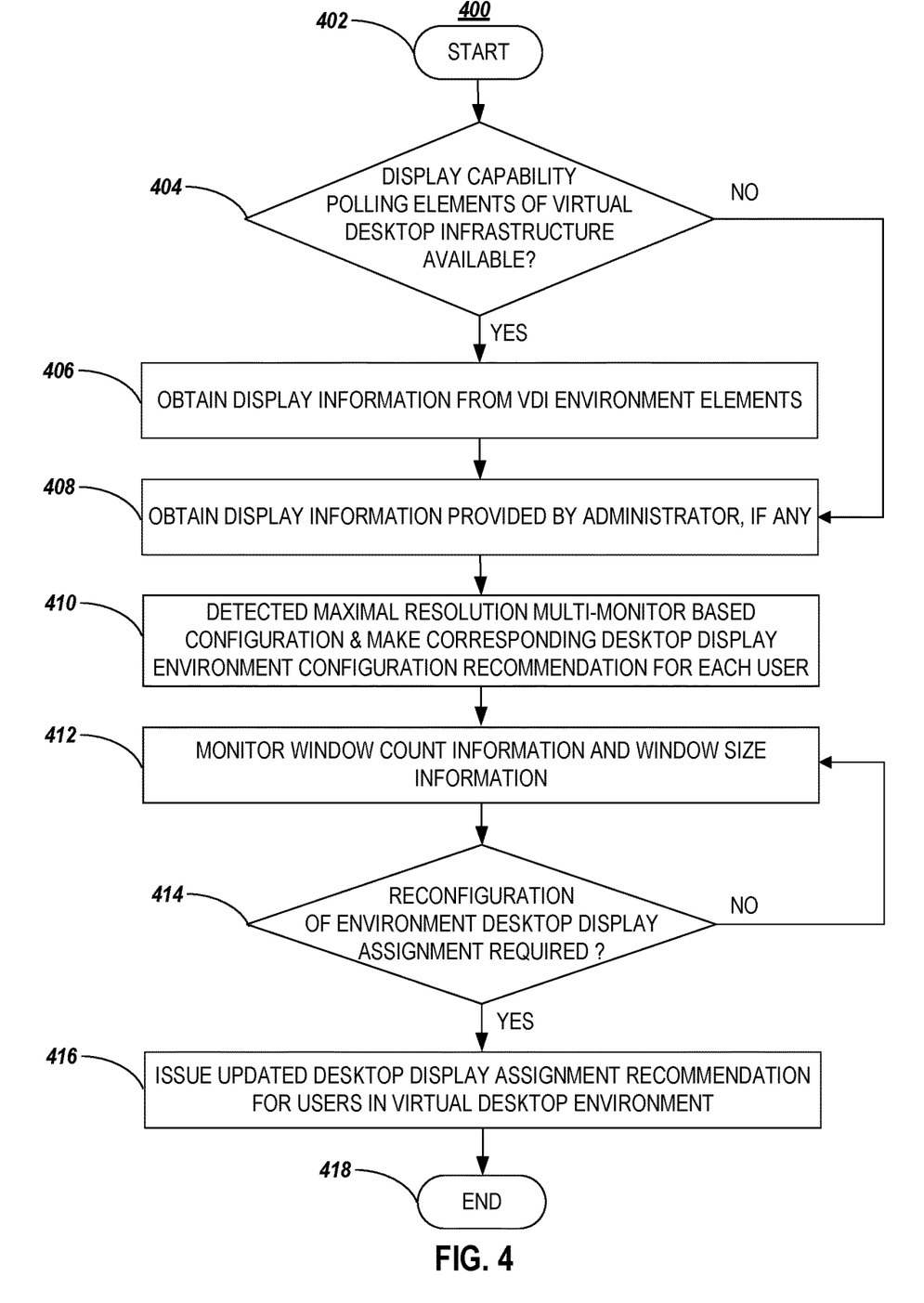
FIG. 4 depicts an exemplary process for implementing a physical PC estate configuration mode of operation for a VDI environment, according to embodiments of the present disclosure.

FIG. 4 depicts an exemplary process for implementing a maximal configuration mode of operation for a VDI environment, according to embodiments of the present disclosure. Process 400 is similar to process 300 in FIG. 3 with the main exception that the process 400 in FIG. 4 may be used to implement a maximal multi-monitor configuration mode of operation, rather than, for example, allowing only one monitor per user to commence process 400.

In one or more embodiments, once a capacity for a number of monitors and resolutions that are supported in a given VDI architecture is determined, and it is further determined that an actual monitor size and count utilization for a group of users falls below a certain threshold, e.g., for a certain length of time or for an average utilization of 75%, monitors for those user(s) may be withdrawn in a manner previously mentioned.

Figure 5:
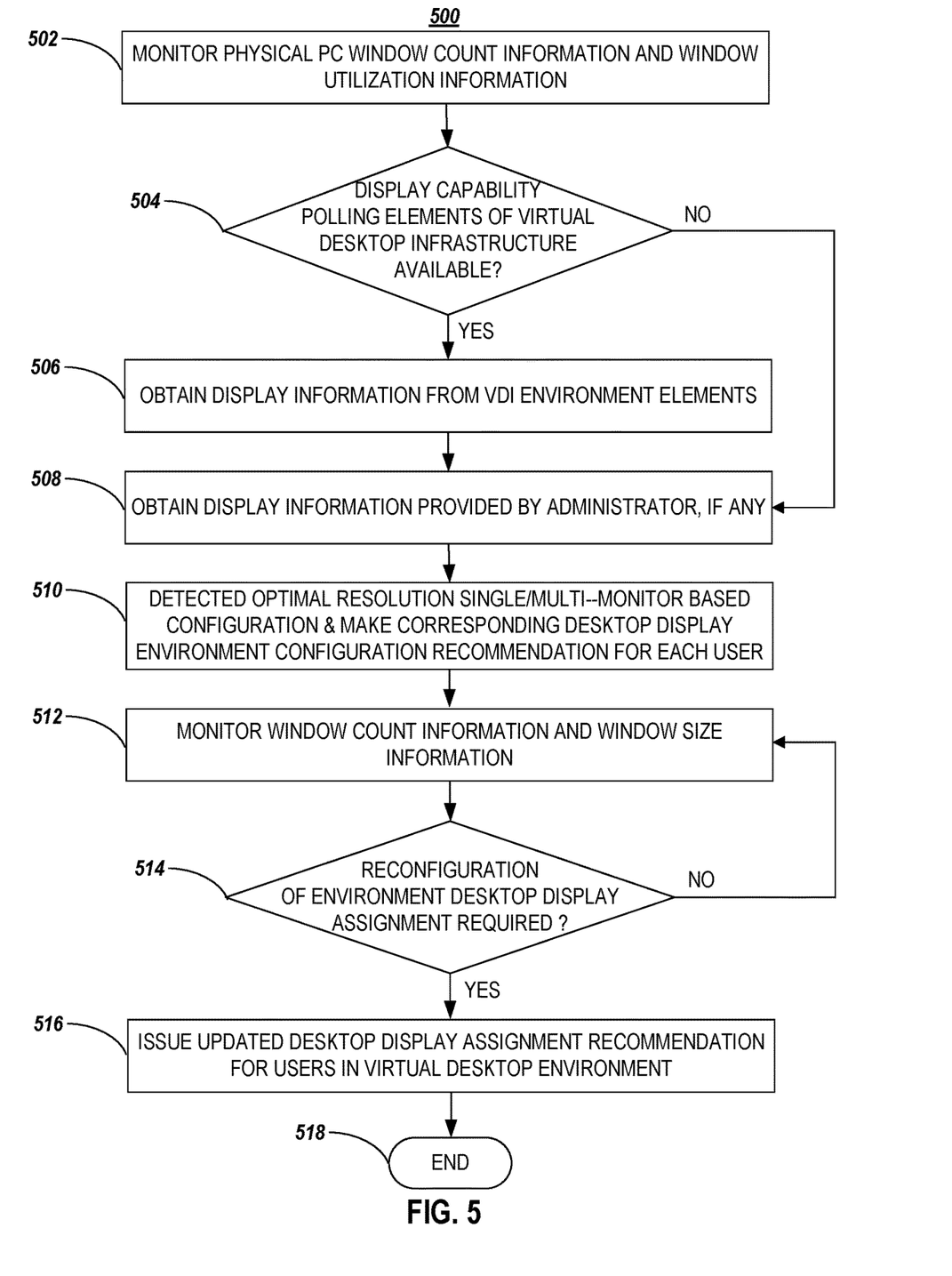
FIG. 5 depicts a simplified block diagram of an information handling system, according to embodiments of the present disclosure.

FIG. 5 depicts an exemplary process for implementing a physical PC estate configuration mode of operation for a VDI environment, according to embodiments of the present disclosure. In one or more embodiments, process 500 may begin by monitoring (502) a physical PC monitor count and utilization information and determining (504) whether capability polling elements in the VDI environment are available to provide display information. If so, display information may be obtained (506) from the elements in the VDI environment. Otherwise, process 500 may continue with obtaining (508) display information that may have been provided by an administrator. As previously mentioned with respect to FIG. 3 and FIG. 4, once display information has been obtained (506) from elements in the VDI environment, additional display information may be obtained (508) from the administrator, and process 500 may continue by detecting an optimal resolution single or multi monitor based configuration and recommending (510) a corresponding VDD configuration, for example, for each user in the VDI environment.

In one or more embodiments, elements in the VDI environment may be monitored (512) as before to obtain VDD utilization information that may be used to determine (514) whether the VDD configuration recommendation should be updated based on actual window usage obtained at step (512). If so, the VDD configuration recommendation may be updated (516). Alternatively, process 500 may return to resume monitoring (512), e.g., physical devices, to make recommendations.

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a CPU or hardware or software control logic, read only memory (ROM), and/or other types of memory. Additional components of the computing system may include one or more drives (e.g., hard disk drives, solid state drive, or both), one or more network ports for communicating with external devices as well as various input and output (I/O) devices, such as a keyboard, mouse, stylus, touchscreen, and/or video display. The computing system may also include one or more buses operable to transmit communications between the various hardware components.

Figure 6:
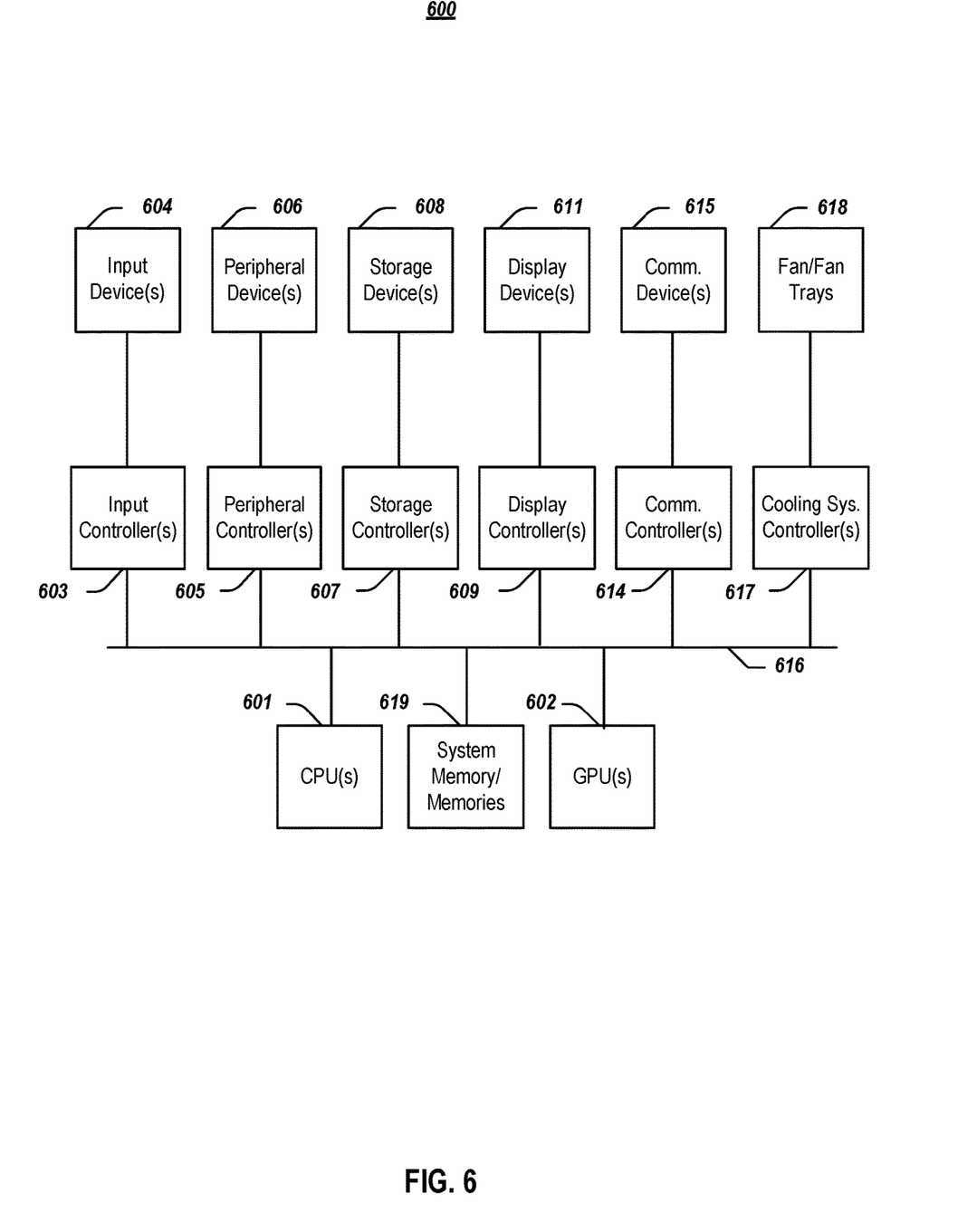
FIG. 6 depicts an alternative block diagram of an information handling system, according to embodiments of the present disclosure.

FIG. 6 depicts a simplified block diagram of an information handling system (or computing system), according to embodiments of the present disclosure. It will be understood that the functionalities shown for system 600 may operate to support various embodiments of a computing system—although it shall be understood that a computing system may be differently configured and include different components, including having fewer or more components as depicted in FIG. 6.

As illustrated in FIG. 6, the computing system 600 includes one or more central processing units (CPU) 601 that provides computing resources and controls the computer. CPU 601 may be implemented with a microprocessor or the like and may also include one or more GPUs 602 and/or a floating-point coprocessor for mathematical computations. In one or more embodiments, one or more GPUs 602 may be incorporated within the display controller 609, such as part of a graphics card or cards. The system 600 may also include a system memory 619, which may comprise RAM, ROM, or both.

A number of controllers and peripheral devices may also be provided, as shown in FIG. 6. An input controller 603 represents an interface to various input device(s) 604, such as a keyboard, mouse, touchscreen, and/or stylus. The computing system 600 may also include a storage controller 607 for interfacing with one or more storage devices 608 each of which includes a storage medium such as magnetic tape or disk, or an optical medium that might be used to record programs of instructions for operating systems, utilities, and applications, which may include embodiments of programs that implement various aspects of the present disclosure. Storage device(s) 608 may also be used to store processed data or data to be processed in accordance with the disclosure. The system 600 may also include a display controller 609 for providing an interface to a display device 611, which may be a cathode ray tube (CRT) display, a thin film transistor (TFT) display, organic light-emitting diode, electroluminescent panel, plasma panel, or any other type of display. The computing system 600 may also include one or more peripheral controllers or interfaces 605 for one or more peripherals 606. Examples of peripherals may include one or more printers, scanners, input devices, output devices, sensors, and the like. A communications controller 614 may interface with one or more communication devices 615, which enables the system 600 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 600 comprises one or more fans or fan trays 618 and a cooling subsystem controller or controllers 617 that monitors thermal temperature(s) of the system 600 (or components thereof) and operates the fans/fan trays 618 to help regulate the temperature.

In the illustrated system, all major system components may connect to a bus 616, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Figure 7:
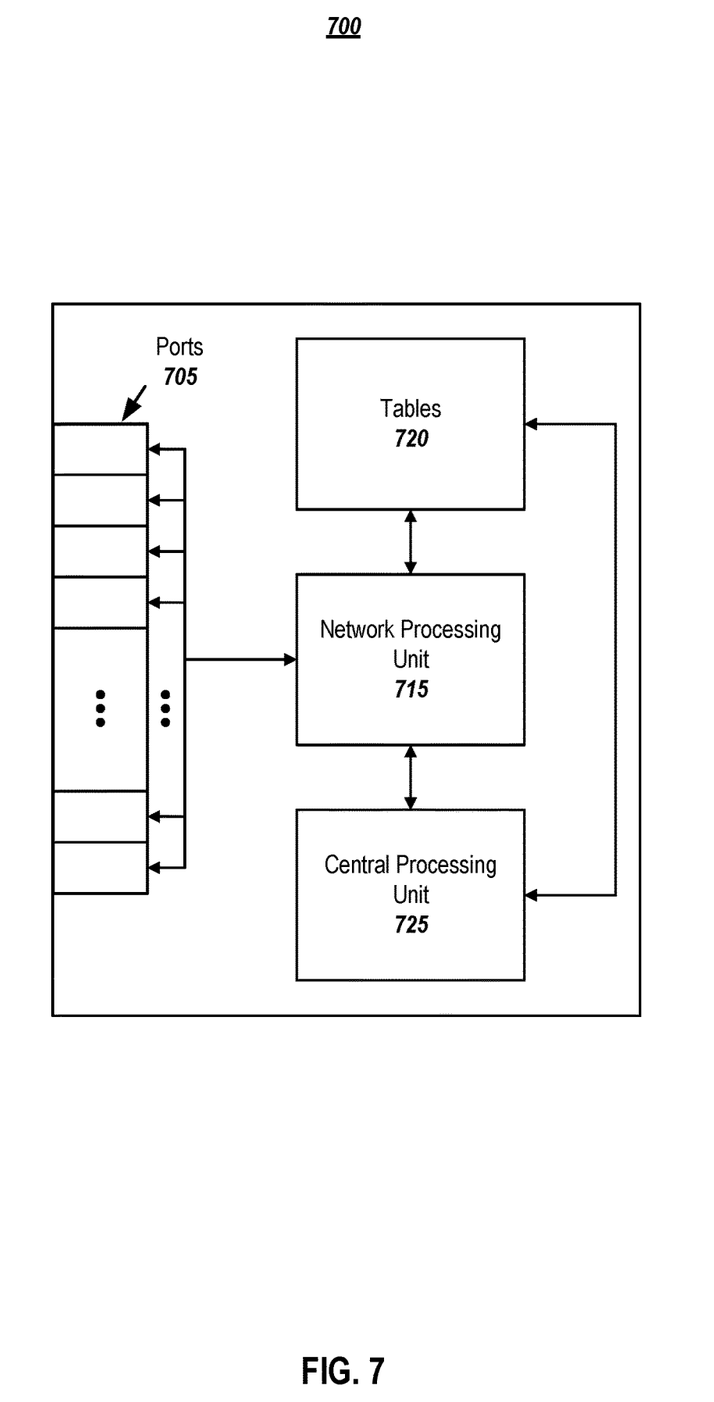
FIG. 7 depicts an alternative block diagram of an information handling system, according to embodiments of the present disclosure.

FIG. 7 depicts an alternative block diagram of an information handling system, according to embodiments of the present disclosure. It will be understood that the functionalities shown for system 700 may operate to support various embodiments of the present disclosure—although it shall be understood that such system may be differently configured and include different components, additional components, or fewer components.

The information handling system 700 may include a plurality of I/O ports 705, a network processing unit (NPU) 715, one or more tables 720, and a central processing unit (CPU) 725. The system includes a power supply (not shown) and may also include other components, which are not shown for sake of simplicity.

In one or more embodiments, the I/O ports 705 may be connected via one or more cables to one or more other network devices or clients. The network processing unit 715 may use information included in the network data received at the node 700, as well as information stored in the tables 720, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CDs and holographic devices; magneto-optical media; and hardware devices that are specially configured to store or to store and execute program code, such as ASICs, programmable logic devices (PLDs), flash memory devices, other non-volatile memory (NVM) devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for implementing a configuration mode of operation for a virtual desktop infrastructure (VDI) environment, the method comprising:
   for a VDI environment, receiving display information from at least one of an administrator or one or more elements within the VDI environment, the display information comprising monitor count capability information, which comprises information concerning a measure of what a system or a sub-system can support, and monitor resolution capability information;
   using the display information to generate a virtual desktop display (VDD) configuration recommendation comprising an initial monitor count and an initial monitor resolution;
   obtaining from the one or more elements VDD utilization information that comprises one or more actual window counts and one or more actual window sizes; and
   updating the VDD configuration recommendation according to the VDD utilization information to conserve computing resources or enhance a user experience.

2. The computer-implemented method of claim 1, wherein obtaining the VDD utilization information comprises monitoring the one or more elements to obtain at least some of the display information.

3. The computer-implemented method of claim 1, further comprising calculating an overall available desktop monitor space for the VDI environment.

4. The computer-implemented method of claim 1, wherein the display information is indicative of how many of the one or more elements are available to provide at least some of the display information.

5. The computer-implemented method of claim 1, wherein the display information is received via an application programming interface (API).

6. The computer-implemented method of claim 1, wherein updating the VDD configuration recommendation comprises adjusting at least one of a monitor count configuration or a monitor resolution configuration to increase a user per host density.

7. The computer-implemented method of claim 6, wherein the VDI environment provides at least one of virtual graphics processing unit information or protocol information.

8. An information handling system for implementing a configuration mode of operation for a virtual desktop infrastructure (VDI) environment, the information handling system comprising:
   a VDI environment that comprises:
      at least two of a VDI virtual machine estate, a VDI management environment, and a client device estate; and
   a virtual desktop display (VDD) assignment device that comprises:
      a rules-based module that performs steps comprising:
         receiving display information from at least one of an administrator or one or more elements within the VDI environment, the display information comprising monitor count capability which comprises information concerning a measure of what a system or a sub-system can support, information and monitor resolution capability information; and
         using the display information to generate a VDD configuration recommendation that comprises an initial monitor count and an initial monitor resolution; and
      a monitoring module that obtains from the one or more elements VDD utilization information that comprises one or more actual window counts and one or more actual window sizes, the rules-based module updates the VDD configuration recommendation according to the VDD utilization information to conserve computing resources or enhance a user experience.

9. The information handling system of claim 8, further comprising an application logic that uses the display information to determine a maximum capability of VDI environment.

10. The information handling system of claim 8, wherein the VDD assignment device calculates an overall available desktop monitor space for the VDI environment.

11. The information handling system of claim 8, wherein the display information is indicative of how many of the one or more elements are available to provide at least some of the display information.

12. The information handling system of claim 8, wherein the display information is received via an application programming interface (API).

13. The information handling system of claim 8, wherein the rules-based module updates the VDD configuration recommendation by adjusting at least one of a monitor count configuration or a monitor resolution configuration.

14. The information handling system of claim 8, wherein the VDI environment provides at least one of virtual graphics processing unit information or protocol information.

15. A system for implementing a configuration mode of operation for a virtual desktop infrastructure (VDI) environment, the system comprising:
   one or more processors; and a non-transitory computer-readable medium or media comprising one or more sets of instructions which, when executed by at least one of the one or more processors, causes steps to be performed comprising:

for a VDI environment, receiving display information from at least one of an administrator or one or more elements within the VDI environment, the display information comprising monitor count capability information which comprises information concerning a measure of what a system or a sub-system can support, and monitor resolution capability information;

using the display information to generate a virtual desktop display (VDD) configuration recommendation comprising an initial monitor count and an initial monitor resolution;

obtaining from the one or more elements VDD utilization information that comprises one or more actual window counts and one or more actual window sizes; and updating the VDD configuration recommendation according to the VDD utilization information to conserve computing resources or enhance a user experience.

16. The system of claim 15, wherein the initial monitor resolution comprises at least one of a minimal resolution or a maximal resolution for one or more monitors.

17. The system of claim 15, wherein the display information is received by a VDD assignment device that comprises a rules-based module and a monitoring module.

18. The system of claim 15, wherein obtaining the VDD utilization information comprises monitoring the one or more elements to obtain at least some of the display information.

19. The system of claim 15, further comprising calculating an overall available desktop monitor space for the VDI environment.

20. The system of claim 15, wherein updating the VDD configuration recommendation comprises adjusting at least one of a monitor count configuration or a monitor resolution configuration to increase a user per host density.

* * * * *